US011409054B2

(12) United States Patent
Cloud et al.

(10) Patent No.: US 11,409,054 B2
(45) Date of Patent: Aug. 9, 2022

(54) METHOD AND APPARATUS FOR ASSEMBLING UNIBOOT FIBER OPTIC CONNECTORS

(71) Applicant: US Conec, Ltd, Hickory, NC (US)

(72) Inventors: Mitchell Cloud, Matthews, NC (US); Darrell R. Childers, Hickory, NC (US)

(73) Assignee: US Conec Ltd., Hickory, NC (US)

( * ) Notice: Subject to any disclaimer, the term of this patent is extended or adjusted under 35 U.S.C. 154(b) by 0 days.

(21) Appl. No.: 16/410,935

(22) Filed: May 13, 2019

(65) Prior Publication Data
US 2019/0346633 A1     Nov. 14, 2019

Related U.S. Application Data

(60) Provisional application No. 62/670,132, filed on May 11, 2018.

(51) Int. Cl.
    *G02B 6/38*     (2006.01)
(52) U.S. Cl.
    CPC ......... *G02B 6/3879* (2013.01); *G02B 6/3825* (2013.01)
(58) Field of Classification Search
    CPC ............................ G02B 6/3879; G02B 6/3825
    USPC .......................................................... 385/78
    See application file for complete search history.

(56) References Cited

U.S. PATENT DOCUMENTS

| | | | | |
|---|---|---|---|---|
| 4,687,291 A * | 8/1987 | Stape | ................... | G02B 6/3807 385/59 |
| 5,076,656 A * | 12/1991 | Briggs | ................. | H01R 13/447 385/71 |
| 5,080,582 A * | 1/1992 | Salzberg | ............. | B29C 35/0288 156/158 |
| 5,283,849 A * | 2/1994 | Cooke | .................. | G02B 6/3861 385/77 |
| 5,315,679 A * | 5/1994 | Baldwin | .............. | G02B 6/3869 385/76 |
| 5,604,830 A * | 2/1997 | Kuder | .................. | G02B 6/1221 385/59 |
| 5,647,043 A * | 7/1997 | Anderson | ............ | G02B 6/3825 385/78 |
| 5,867,620 A * | 2/1999 | Bunin | .................. | G02B 6/3834 385/53 |
| 5,907,651 A * | 5/1999 | Bunin | .................. | G02B 6/3855 385/80 |
| 5,923,803 A * | 7/1999 | Bunin | .................. | G02B 6/3885 385/80 |
| 5,963,691 A * | 10/1999 | Bunin | .................. | G02B 6/3885 385/78 |
| 6,439,780 B1 * | 8/2002 | Mudd | .................. | G02B 6/3807 385/83 |
| 6,821,027 B2 * | 11/2004 | Lee | ....................... | G02B 6/4249 385/89 |

(Continued)

FOREIGN PATENT DOCUMENTS

| | | | | |
|---|---|---|---|---|
| CN | 104395800 B | * | 5/2016 | ........... G02B 6/3826 |
| WO | WO-2013104125 A1 | * | 7/2013 | ........... G02B 6/3846 |

*Primary Examiner* — Kaveh C Kianni
(74) *Attorney, Agent, or Firm* — Michael L. Leetzow, P.A.; Shubhrangshu Sengupta

(57) ABSTRACT

A method for assembling a uniboot fiber optic connector includes the disposing of portions of optical assemblies against a first stop surface and a portion of an optical fiber jacket against a second stop surface. The stop surfaces may be disposed on a fixture that can be used to assemble the fiber optic connector.

11 Claims, 14 Drawing Sheets

(56) References Cited

U.S. PATENT DOCUMENTS

| | | | |
|---|---|---|---|
| 2002/0131713 A1* | 9/2002 | Peng | G02B 6/3636 |
| | | | 385/43 |
| 2006/0269194 A1* | 11/2006 | Luther | G02B 6/3851 |
| | | | 385/78 |
| 2009/0191738 A1* | 7/2009 | Kadar-Kallen | G02B 6/389 |
| | | | 439/207 |
| 2011/0252634 A1* | 10/2011 | Pons | G02B 6/3887 |
| | | | 29/729 |
| 2013/0078587 A1* | 3/2013 | Christopher | B01F 15/042 |
| | | | 432/1 |
| 2014/0050443 A1* | 2/2014 | Lee | G02B 6/3879 |
| | | | 385/77 |
| 2014/0133808 A1* | 5/2014 | Hill | G02B 6/3857 |
| | | | 385/81 |
| 2015/0003790 A1* | 1/2015 | Wu | G02B 6/3879 |
| | | | 385/81 |
| 2015/0177463 A1* | 6/2015 | Lee | G02B 6/387 |
| | | | 385/76 |
| 2016/0223765 A1* | 8/2016 | Krabe | H01L 33/005 |
| 2017/0343741 A1* | 11/2017 | Coenegracht | G02B 6/3821 |
| 2018/0088288 A1* | 3/2018 | Taira | G02B 6/3863 |
| 2019/0101709 A1* | 4/2019 | Wang | G02B 6/3887 |
| 2019/0162910 A1* | 5/2019 | Gurreri | G02B 6/3869 |
| 2019/0353853 A1* | 11/2019 | Pepe | G02B 6/30 |

* cited by examiner

METHOD AND APPARATUS FOR ASSEMBLING UNIBOOT FIBER OPTIC CONNECTORS

REFERENCE TO RELATED CASE

This application claims priority under 35 U.S.C. § 119 (e) to provisional application No. 62/670,132 filed on May 11, 2018, contents of which are hereby incorporated by reference in their entirety.

BACKGROUND OF THE INVENTION

Field of the Invention

Uniboot fiber optic connectors have two fiber-optic ferrules, each with a single optical fiber secured therein, and the fiber optic ferrules need to be precisely aligned within the connector. The term "uniboot" generally refers to two optical fibers having a single boot connected to a housing inside which fibers reside. It is also important that the length of the optical fibers from the ends of the fiber-optic ferrules to a point where the fiber-optic cable containing the optical fibers is secured within the fiber-optic connector. Up until now, the ferrule holders and the optical fibers have been taped to an oven plate or tray in an attempt to maintain the relationship of the optical fibers to the connector parts. However, the results have been less than adequate and result in a wasteful practice that is labor-intensive and inaccurate. Furthermore, the inability to maintain the relationship of the connector parts also leads to an excess in length of the optical fibers, resulting in and increased bend loss in the final fiber optic connectors.

In order to prevent such issues and to better ensure easier assembling of the fiber optic connector removal, a new apparatus and method to install optical fibers into uniboot fiber optic connectors has been designed.

SUMMARY OF THE INVENTION

The present invention is directed to method of terminating a duplex fiber optic connector on respective optical fibers, the optical fibers having a jacket around at least a portion of the optical fibers, the method including the steps of disposing a pair of optical assemblies against a respective first stop surface, disposing a portion of the jacket against a second stop surface, curing epoxy around an optical fiber in an opening in the optical assemblies, and assembling a body around a portion of the cured optical assemblies.

In some embodiments, the optical assemblies include a ferrule, a ferrule holder, a spring and a lead-in tube.

In some other embodiments, each the optical assemblies include a gear attached to a rear end of the ferrule holder, the method further including the step of inserting a third gear between the gears on the rear ends of the ferrule holders.

In some other embodiments, the optical fibers are inserted into the optical assemblies before being disposed against the first stop surface.

In some embodiments, the step of assembling a body around the cured optical assemblies includes aligning a first body portion from a bottom side of the cured optical assemblies and aligning a second body portion from a top side, the optical fibers passing through a crimp ring, the crimp ring engaging a slot in at least one of the first and second body portions.

According to another aspect of the present invention, there is a fixture to secure a duplex fiber optic connector on respective optical fibers that includes a first stop surface at a first end of the fixture, the first stop surface configured to engage a portion of an optical assembly of the duplex fiber optic connector, a second stop surface spaced from the first stop surface and configured to engage a portion of a jacket surrounding the optical fibers to maintain a relative position of the optical assembly and the jacket, means to secure the optical assembly to the fixture, and means to secure the jacket with the optical fibers to the fixture.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

DETAILED DESCRIPTION OF THE INVENTION

Figure 1:
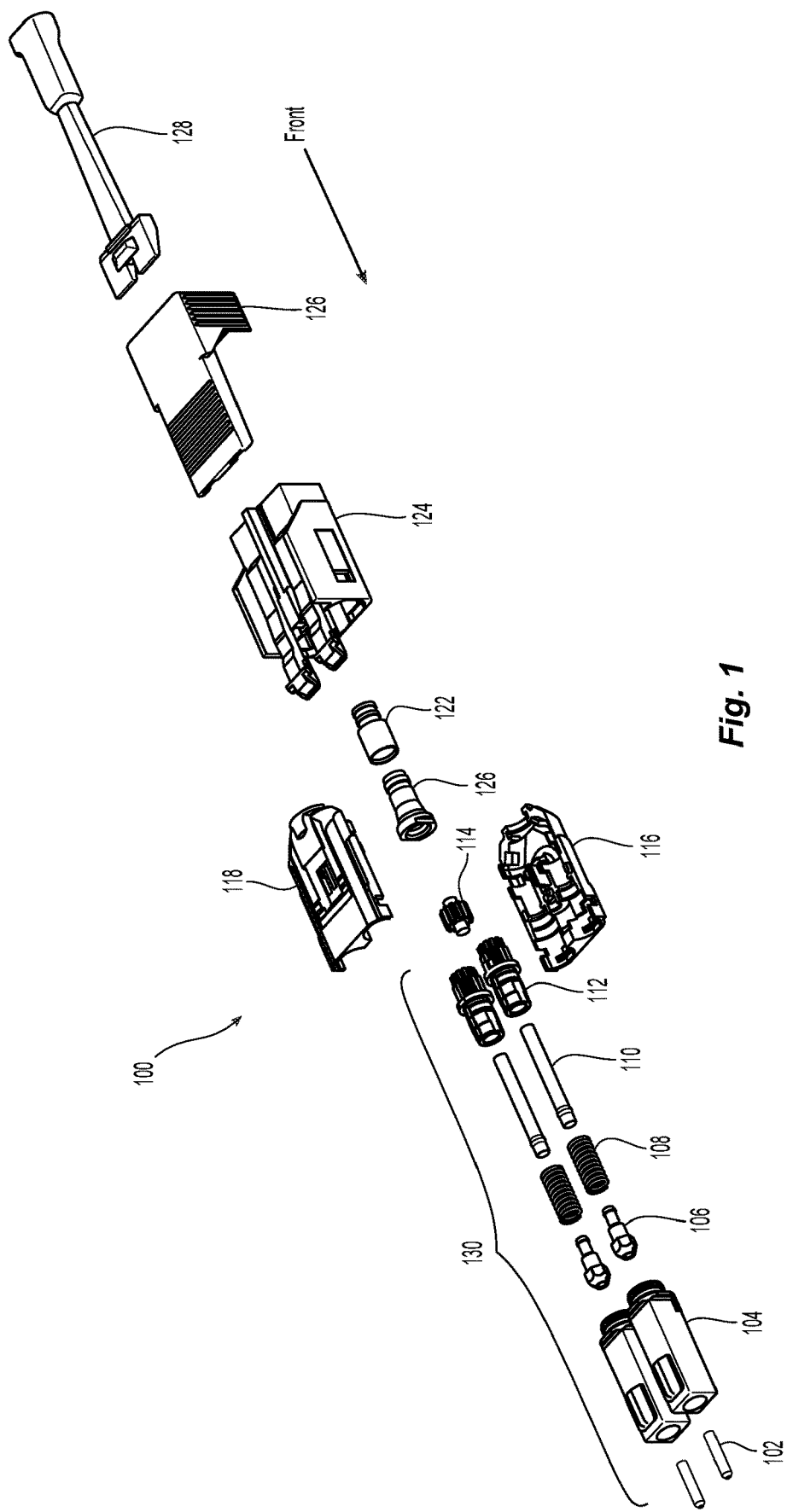
FIG. 1 is a perspective view of one embodiment of an exploded uniboot fiber optic connector according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

One embodiment of a uniboot fiber optic connector 100 is illustrated in FIG. 1 in an exploded view. Starting from the left and moving to the right in the figure, the individual components are fiber optic ferrules 102, housings 104, fiber optic ferrule holders 106, springs 108, lead-in tubes 110, gears 112 for the housings 104, gear 114 to engage the gears 112, first body portion 116, second body portion 118, crimp ring 120, crimp band 122, latch body 124, latch release 126 (both part of an outer housing) and, optionally, push-pull tab 128. The fiber optic ferrules 102, housings 104, fiber optic ferrule holders 106, springs 108, lead-in tubes 110, and gears 112 for the housings 104 may be preassembled. The crimp band 122 may also be a heat shrink assembly, depending on the format of the optical fibers used with the fiber optic connector 100. As noted herein preassembled parts are identified as optical assemblies 130. It should also be noted that the gears 112, 114 may or may not be used, depending on whether the fiber optic connector 100 has a polarity feature. The gears 112, 114 are not required for the assembly or operation of the fiber optic connector 100 if there is no polarity feature for the fiber optic connector 100.

In this application, Applicant uses that the term "front" or "forward" to mean that direction where the fiber optic connector would meet with another fiber-optic connector or device, while the term "rear" or "rearward" is used to mean the direction from which the optical fibers enter into the fiber-optic ferrule or fiber optic connector. Thus, "front" with respect to the apparatus illustrated in FIG. 1 is on the left side of the figure. The rear or rearward direction would be the opposite direction—or to the right in FIG. 1.

Figure 2:
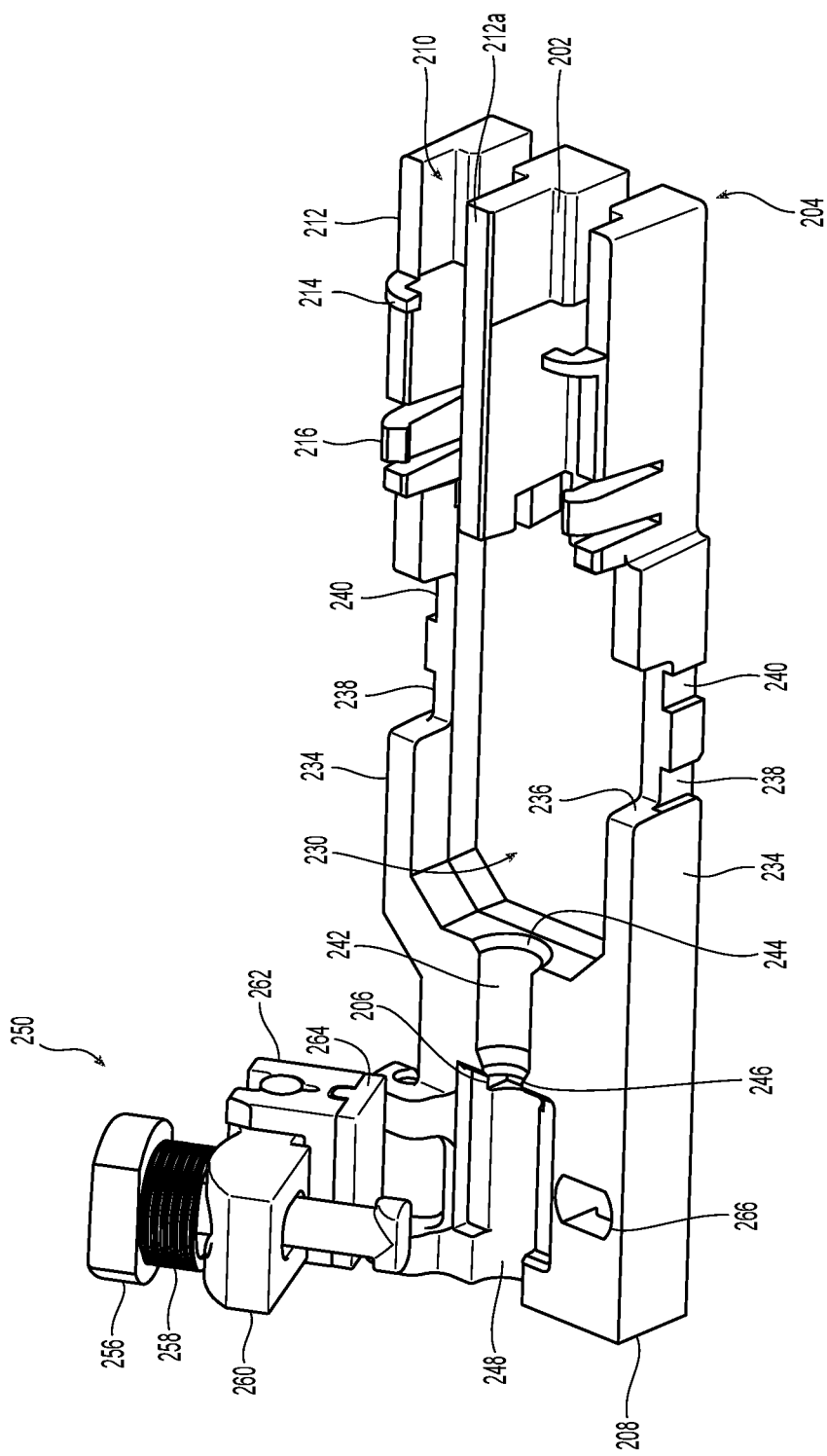
FIG. 2 is a perspective view of one embodiment of a curing fixture for use with a uniboot connector according to the present invention.
Figure 3:
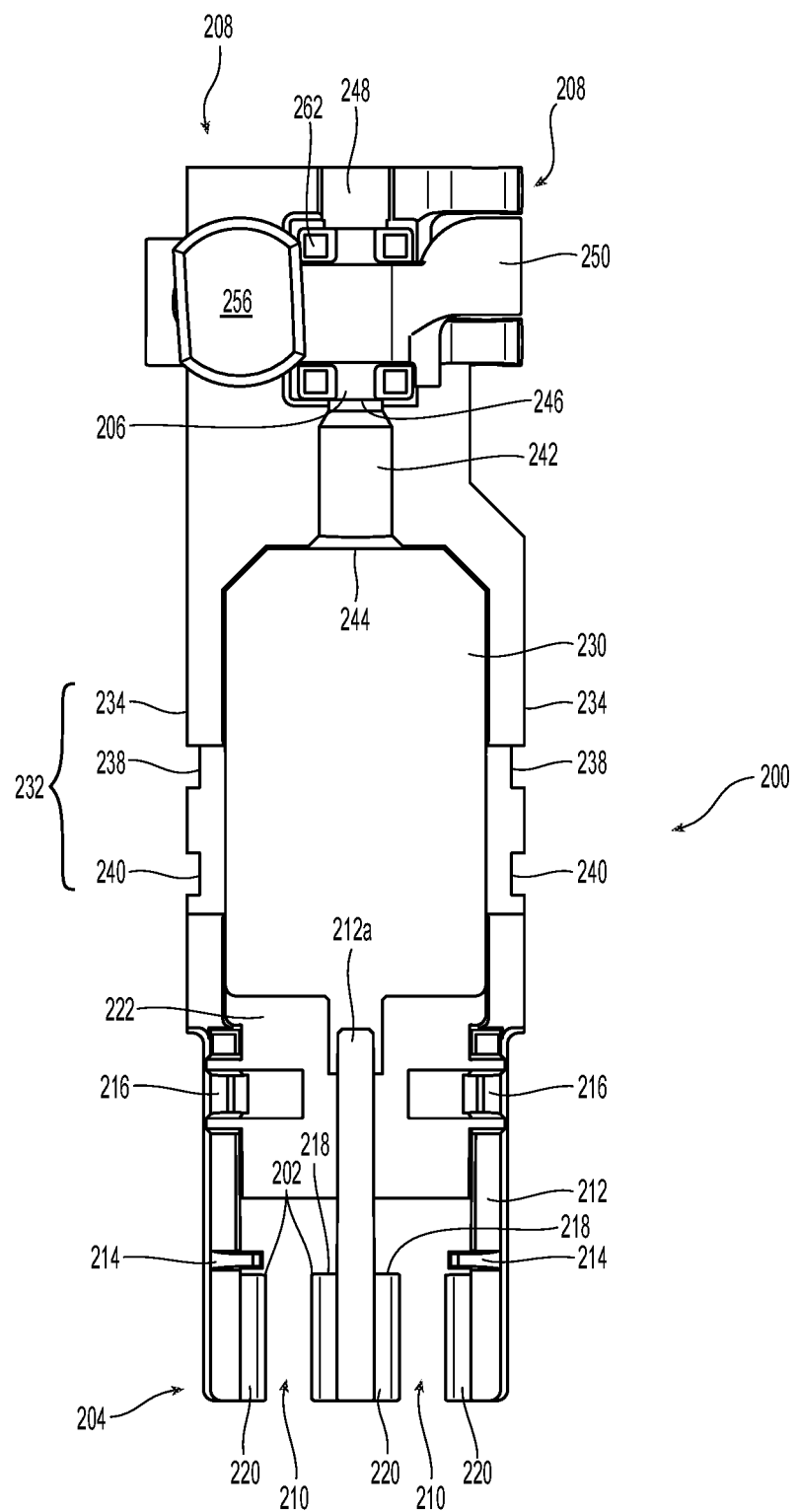
FIG. 3 is a top view of the curing fixture in FIG. 2.

Turning to FIGS. 2 and 3, there is a curing fixture 200 that is preferably used to assemble the fiber optic connector 100. As noted above, the prior art assembly method used tape to secure the optical assemblies on a tray or oven plate. The curing fixture 200 allows for an easier and more accurate assembly of the fiber optic connector 100.

The curing fixture 200 has a first stop surface 202 inward from a first end 204 and a second stop surface 206 spaced from the first stop surface 202 and inward from a second end 208. The curing fixture 200 may also have additional flexible elements that assist in retaining the optical assemblies in the curing fixture 200. For example, the first stop surface 202 is at the end of a channel 210 that preferably fits the optical assembly 130 in a snug fashion. The channel 210 has side walls 212 that may include projections 214 over the channel 210 or tabs 216 that may resiliently engage the optical assemblies 130 to bias them against two central side walls 212 that also forms a central rib 212a between the two channels 210. The first stop surface 202 may be a surface 218 (facing rearwardly) of a projection 220 from the side walls 212 or may be a continuation of the side wall 212. The channels 210 also preferably include a bottom 222 to assist in supporting the optical assemblies 130.

The curing fixture 200 has an opening 230 in a central portion 232. The opening 230 is partially formed by the side walls 212 and bottom 222 at the first end 204. The opening 230 is also partially formed by two side arms 234 that extend from two side walls 212 at the first end 204 and connect with the second end 208. As noted in detail below, the opening 230 allows for access to the optical assemblies 130 and the addition of the body portions 116,118 to the optical assemblies 130. The two side arms 234 also include an upper notch 236 and two side notches, first side notch 238 and second side notch 240. The notches 236,238,240 are used by a gear installation tool if a gear is to be used for the polarity feature.

The second end 208 includes the second stop surface 206 that is at the end of a crimp ring channel 242. The crimp ring channel 242 extends between a first end 244 at the opening 230 and a second end 246 at the second stop surface 206. The second stop surface 206 is also between the crimp ring channel 242 and the optical fiber channel 248. The optical fiber channel 248 is where the optical fibers are placed and secured during the process.

Figure 4:
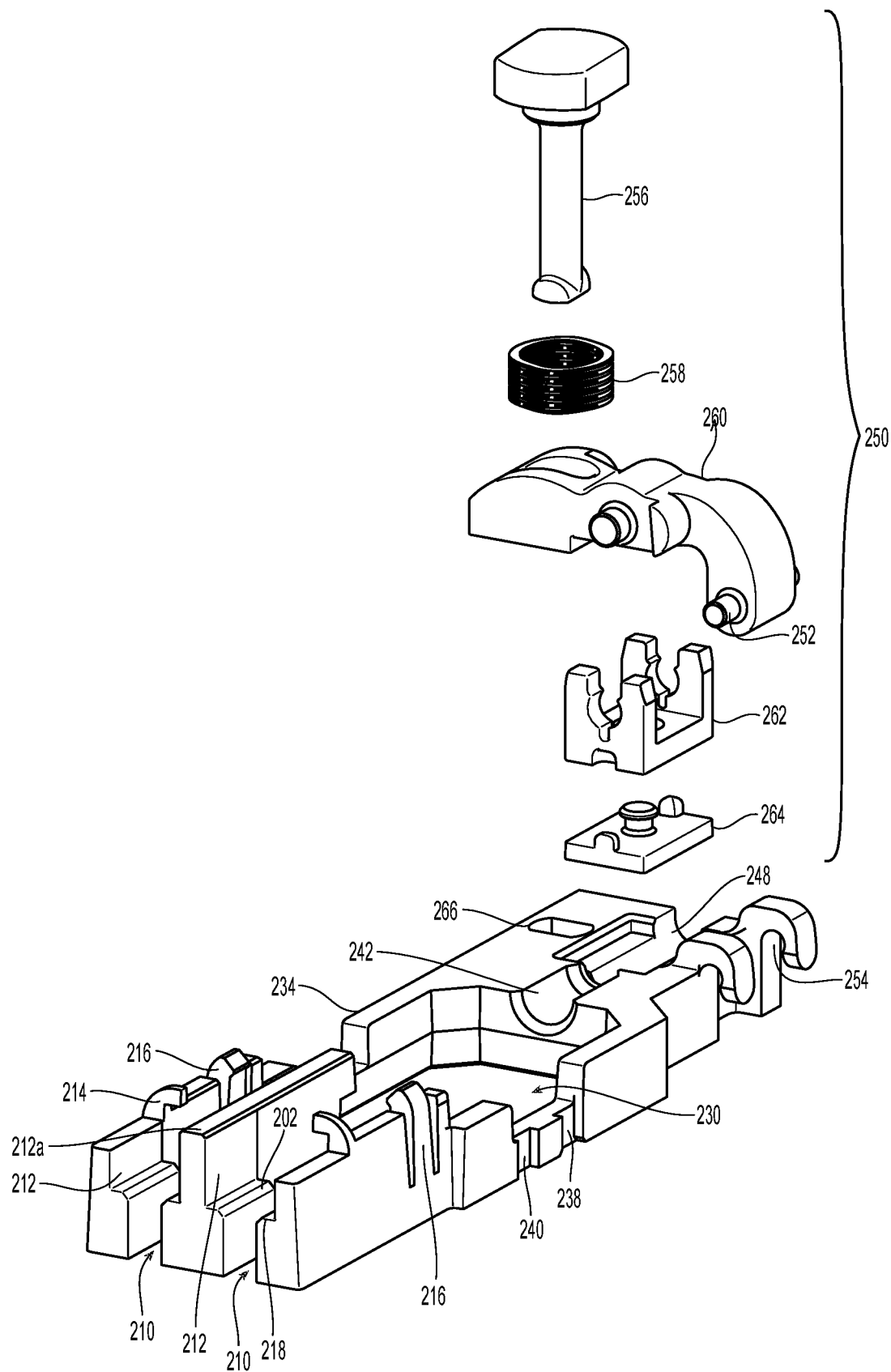
FIG. 4 is a perspective view of the curing fixture in FIG. 2 in an exploded state.

The curing fixture 200 also has a clamp 250 disposed next to the optical fiber channel 248 at the second end 208 to carefully secure the optical fibers. The clamp 250 is rotatably connectable to the curing fixture 200 by way of ears 252 (FIG. 4) on the clamp 250 and openings 254 on the curing fixture 200 to receive the ears 252. The clamp 250 may have a handle 256, a spring 258, a door 260, and a pad holder 262 for a pad 264. The curing fixture 200 has an opening 266 next to the optical fiber channel 248 to receive a portion of the handle 256 to hold the clamp 250 closed and onto optical fibers inserted into the optical fiber channel 248. The clamp 250 is preferably closed after the jacket of the optical fibers is disposed against the second stop surface 206.

There are other ways in which the optical fibers could be secured to the curing fixture 200. For example, the optical fiber channel 248 could have a magnetic strip and attract a hinged metal door to the magnetic strip. There may also be a zip-tie like attachment member that can be cinched down on the optical fibers in the optical fiber channel 248. Additionally, a flexible and elastic ribbon may be used to encircle at least a portion of the curing fixture 200 and the optical ribbons.

Figure 6:
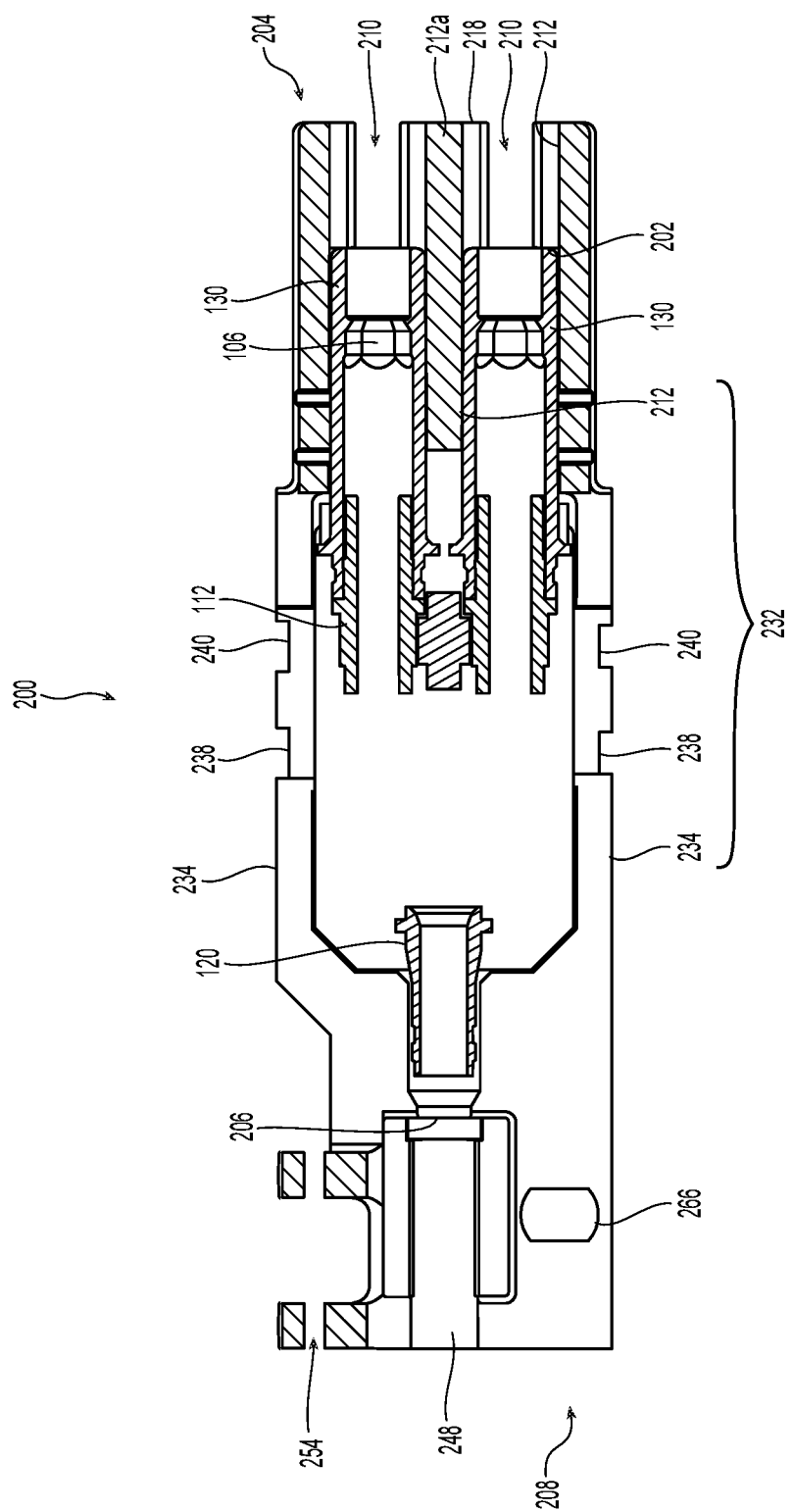
FIG. 6 is a top cross sectional view of the curing fixture with two optical assemblies disposed therein.

The crimp ring channel 242 accepts the crimp ring 120 after the crimp ring 120 has been installed on the optical fibers, see FIG. 6, and the jacket has been disposed against the second stop surface 206. The crimp ring 120 too is preferably placed in the crimp ring channel 242 before the clamp 250 is closed on the optical fibers in the optical fiber channel 248.

Figure 5:
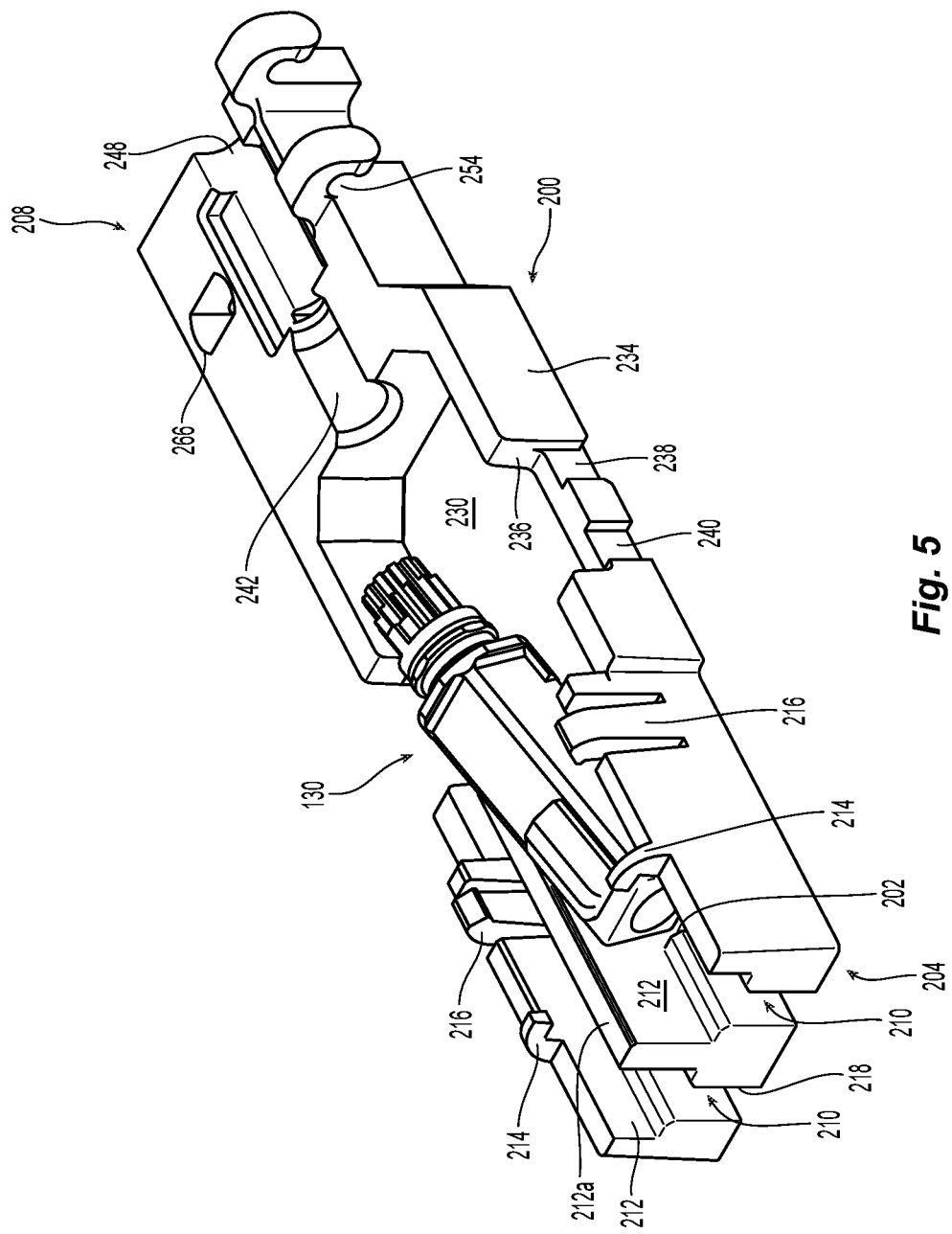
FIG. 5 is a perspective view of the curing fixture with a portion of the uniboot fiber optic connector and with the optical fiber clamp removed for clarity.

The placement of the parts in the curing fixture 200 will now be described, in particular relation to FIGS. 5 and 6. In FIG. 5, one of the optical assemblies 130 (the second optical assembly, the fiber optic ferrule 102, and the optical fibers have been omitted for clarity), is being inserted into the curing fixture 200. The optical assembly 130 is being inserted into a channel 210 from the top side of the curing fixture 200 and at an angle. The optical assembly 130 may also be inserted into the channel 210 in a manner more parallel to the bottom 222 of the channel 210. As the housing 104 is pressed into the channel 210 between the side walls 212, it pushes the tab 216 out of the way. The front face of the housing 104 is placed against the first stop surface 202 and pushed down against the bottom 222. The housing 104 is now secure within the curing fixture 200. The housing 104 of the optical assembly 130 is illustrated in FIGS. 5 and 6 with having the gears 112, but it is not necessary if polarity is not an issue.

It should be noted that optical fibers could be inserted into the optical assemblies 130 either before or after the optical assemblies 130 are inserted into the curing fixture 200. As is known in the art, epoxy is inserted into the rear end of the optical assembly 130 and the lead-in tubes 110 in particular. The optical fibers, which have been stripped to bare fibers at the ends that are being inserted into the optical assemblies 130, are then inserted through the back end of the optical assemblies 130. The optical fibers are preferably prepared as is known in the art. It should be noted at this time the crimp band 122 and then the crimp ring 120 have already been placed on the optical fibers and the crimp band 122 pushed back out of the way. If the optical fibers are inserted before the optical assembly 130 is placed into the curing fixture 200, then the optical assembly 130 and the optical fibers are moved to the curing fixture 200 at the same time. The housing 104 of the optical assembly 130 is placed against the first stop surface 202 and the optical fibers, previously prepared, are placed in the optical fiber channel 248 with the jacket covering the optical fibers disposed against the second stop surface 206. The crimp ring 120 is disposed within the crimp ring channel 242. The clamp 250 is then engaged to retain the optical fibers in the optical fiber channel 248 of the curing fixture 200. The optical fibers extend from the rear of the optical assemblies 130 through the crimp ring 120 and under the clamp 250. Thus, the optical fibers extend above and across the opening 230 in the curing fixture 200.

If the optical fibers are to be inserted after the optical assemblies 130 are disposed within the curing fixture 200, then the optical fibers are inserted into the optical assemblies 130 after epoxy has been inserted (either before or after the optical assemblies 130 are disposed within the curing fixture 200). The crimp ring 120, with the optical fibers passing therethrough, is disposed within the crimp ring channel 242. The optical fibers are then placed in the optical fiber channel 248 and secured with the clamp 250. In both cases, the optical assemblies 130, the optical fibers, and the crimp ring 120 are now in a set relationship to one another. It is important, as noted above, that the length of optical fibers between the crimp ring 120 (where the optical fibers/jacket/kevlar will be attached to the crimp ring with the crimp band 122) and the optical assemblies 130 be the same for both of the optical assemblies. This ensures that the optical assemblies 130 are not biased out of alignment in the finished fiber optic connector due to different lengths of optical fibers. The different length of optical fibers may cause the optical fibers to bend or skew the optical assemblies 130, which may give a higher bend loss, or misaligned fiber optic ferrules 102.

The curing fixture 200 can then be placed within an oven or other device to cure the epoxy and secure the optical fibers within the fiber optic ferrules 102. As discussed below in detail, two body portions engage the optical assemblies 130 and the crimp ring 120 to maintain that fixed relationship.

Figure 7:
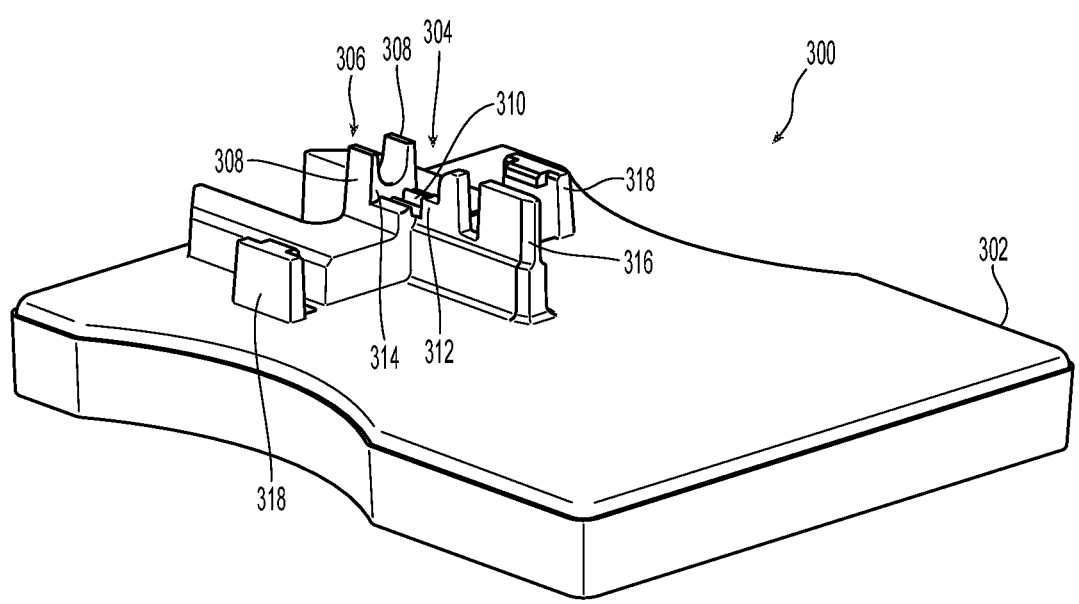
FIG. 7 is a front perspective view of one embodiment of gear installation tool according to the present invention, the gear installation tool used with the curing fixture of FIG. 2.
Figure 8:
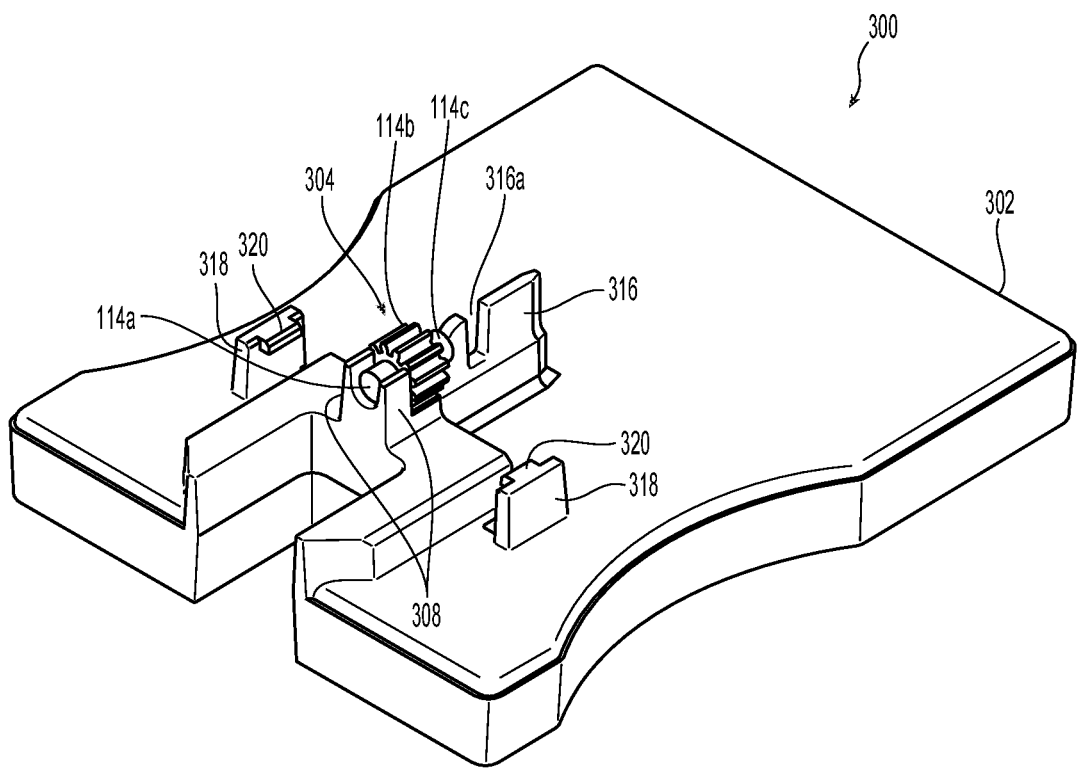
FIG. 8 is rear perspective view of the gear installation tool of FIG. 7 with a gear disposed therein.
Figure 9:
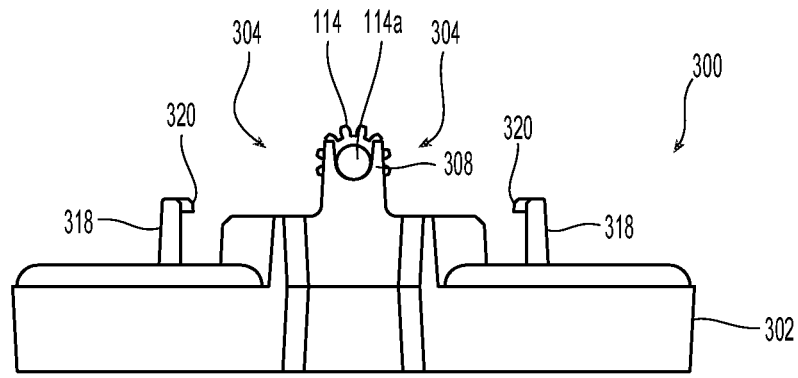
FIG. 9 is a rear elevational view of the gear installation tool of FIG. 7.

If the fiber optic connector 100 is to be able to change polarity, then a gear 114 needs to be disposed between the two gears 112 in the optical assemblies 130. In practice, the gear 114 is rotated, causing the gears 112, which are secured to the optical assemblies 130, to rotate 180 degrees, moving any keying feature on the housings 104 180 degrees. This rotation causes a change in the polarity of the fiber optic connector 100. The optical fibers secured within the optical assemblies 130 can easily handle the rotation through 180 degrees without affecting the operation of the fiber optic connector 100. However, the insertion of the gear 114 needs to be done carefully so as not to misalign the optical assemblies 130 by skewing the alignment at the rear ends thereof. In order to assist in the installation of the gear 114 between the two gears 112 of the optical assemblies 130, there is a gear installation tool 300 illustrated in FIGS. 7-9 that assists in inserting the gear 114 while maintaining the fixed relationship of the optical assemblies 130 and the crimp ring 120. The gear installation tool 300 has a base 302 that cooperates with the curing fixture 200. The base 302 includes a gear holder 304, which further includes a u-shaped rear spindle holder 306 having two arms 308 to support the rear spindle 114a, and a gear support 310 to support the central portion 114b of the gear 114, and a front spindle surface 312 to support the front spindle 114c. The arms 308 also provide a (front facing) surface 314 to assist in moving the gear 114 between the two gears 112. The gear installation tool 300 also includes a wedge 316 that is disposed in front of the front spindle surface 312, as described in more detail below with reference to FIGS. 10 and 11. The wedge 316 engages the two housings 104 of the optical assemblies and forces them away from one another to allow the gear 114 to be disposed between the gears 112. The wedge 316 also includes a wedge notch 316a that corresponds to the back of the housings 104.

Figure 10:
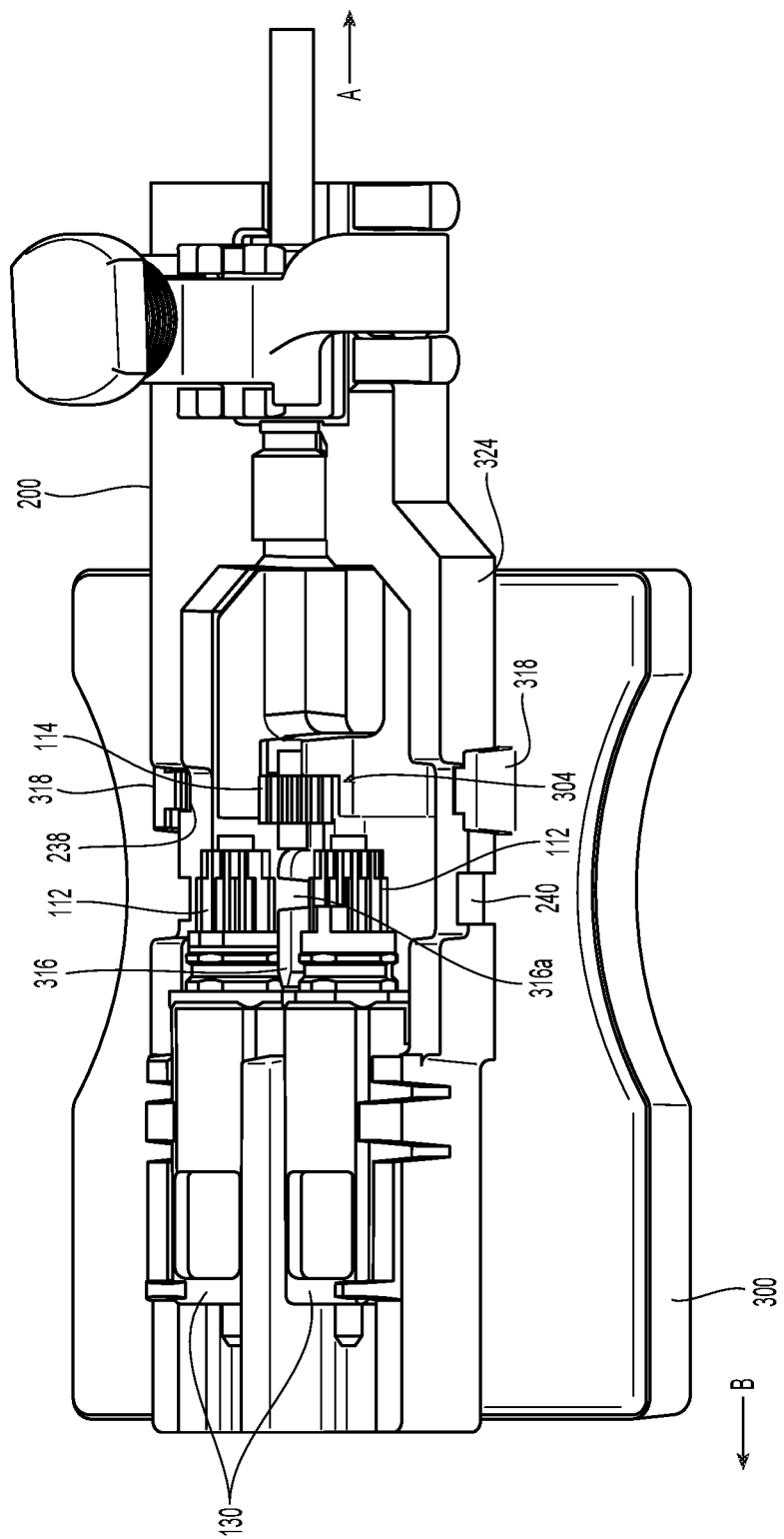
FIG. 10 is a side view of the gear installation tool of FIG. 7 connected to the curing fixture in FIG. 2 and just prior to the insertion of the gear between the two optical assemblies.
Figure 11:
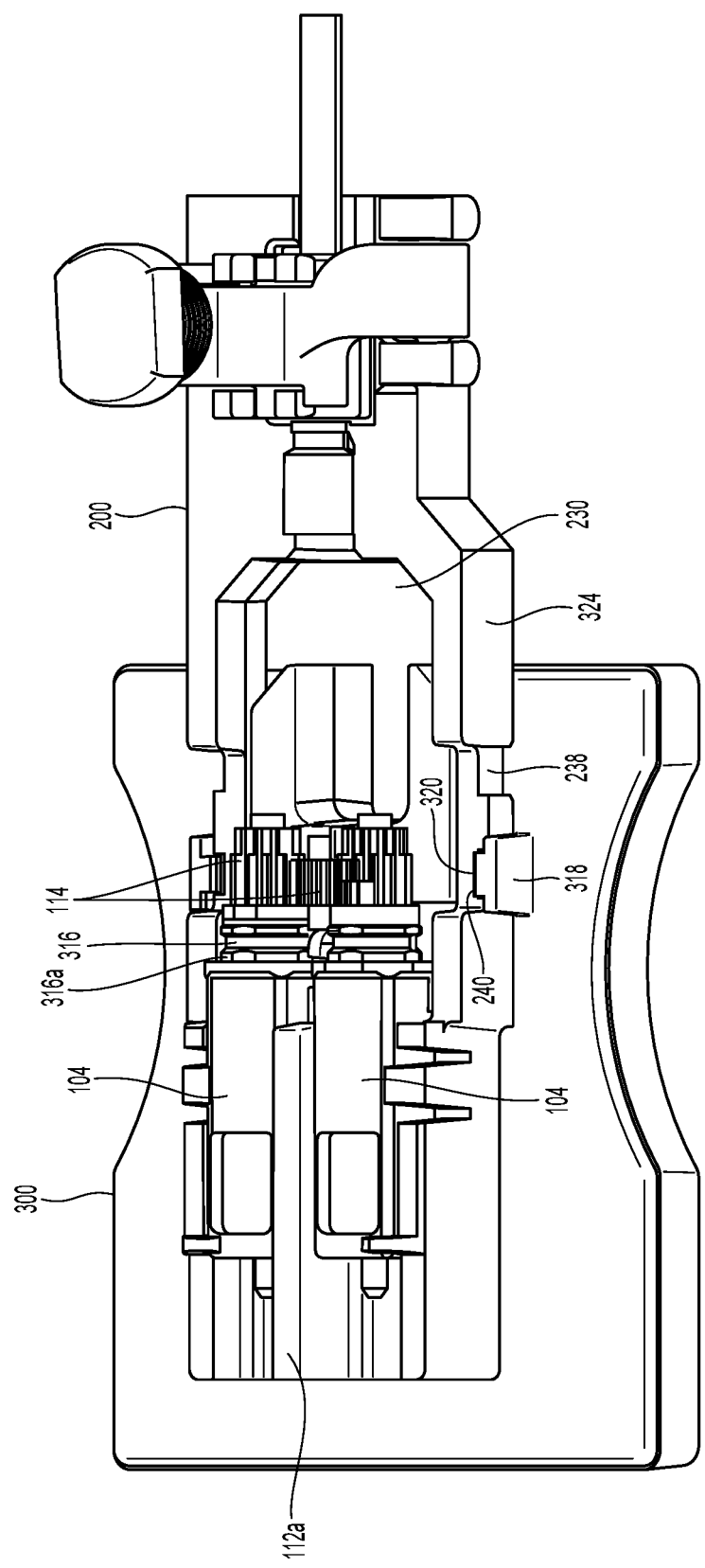
FIG. 11 is a side elevational view of the gear installation tool of FIG. 7 connected to the curing fixture in FIG. 2 and just after the insertion of the gear between the two optical assemblies.

The base 302 also includes two guide posts 318 that position and guide the curing fixture 200 on the gear installation tool 300. The guide posts 318 include projections 320 that extend from the guide posts 318 toward one another. The projections 320 correspond to the notches 236,238,240 and allow the use of the gear installation tool 300 with the curing fixture 200. Turning to FIG. 10, the curing fixture 200 is illustrated as having been placed on top of the gear installation tool 300. The gear holder 304 is aligned with the opening 230 in the curing fixture 220 and protrudes through it. The gear 114 in the gear holder 304 is behind gears 112 attached to the optical assemblies 130. The wedge 316 is also behind and between the housings 104. The two guide posts 318 and the projections 320 are aligned with the first side notches 238 allowing the curing fixture 200 to sit on the gear installation tool 300. If the guide posts 318 and the projections 320 are not aligned with the first side notches 238, the curing fixture 200 will not sit flush on the gear installation tool 300. Additionally, if the guide posts 318 are aligned with the second side notches 240, the gear holder 304 will make contact with the optical assemblies 130, thereby preventing the appropriate alignment of the gear installation tool 300 and the curing fixture 200.

Once the curing fixture 200 and the gear installation tool 300 are aligned with one another, the curing fixture 200 is moved relative to the gear installation tool 300 as illustrated by arrows A and B. For example, the curing fixture 200 can be moved in the directional arrow A while gear installation tool 300 is either held still or moved in the direction of arrow B. Alternatively, the gear installation tool 300 can be moved in the direction of arrow B while the curing fixture tomorrow is either held still or moved in the direction of arrow A. The effect of the relative movement of these two components is that the wedge 316 moves between the two housings 104, while at the same time moving the gear 114 between the two gears 112. When the gear 114 is between the two gears 112, the back end of the housings 104 encounter the wedge notch 316a, allowing the housings 104 to move back toward one another and securing the gear 114 between the two gears 112. The guide posts 318 and the projections 320 are now aligned with the second side notches 240 allowing the curing fixture 200 to be removed from the gear installation tool 300. Once again, if polarity of the optical fiber connector 100 is not an issue, the installation of the gear 114 may not need to be addressed.

Figure 12:
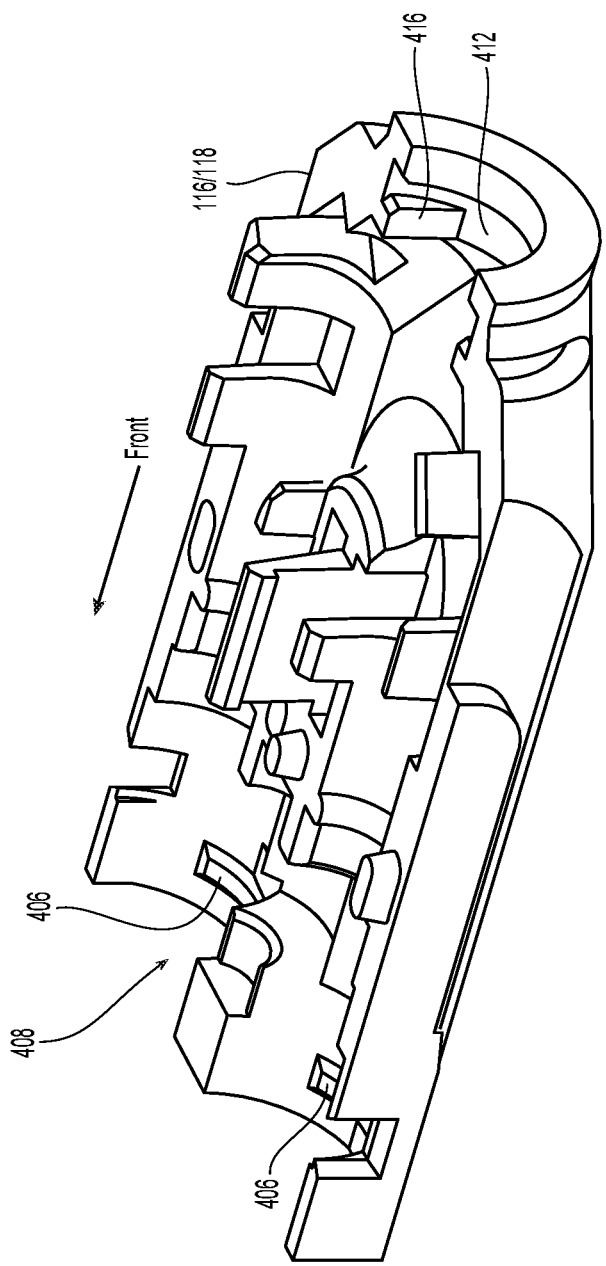
FIG. 12 is a perspective view of a one embodiment of one portion of a body for the uniboot fiber optic connector according to the present invention, the body having two portions, the two portions being the same.
Figure 13:
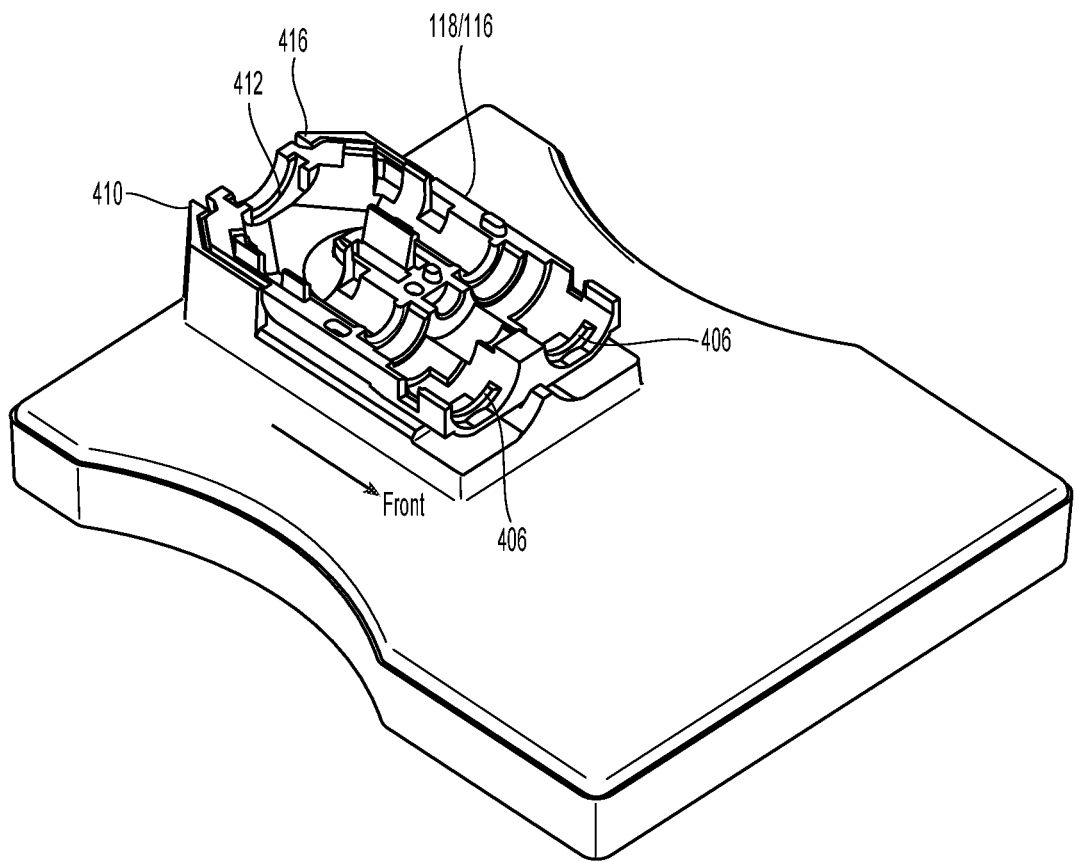
FIG. 13 is a front, left perspective view of one embodiment of a body fixture used with the curing fixture according to the present invention, and having one body portion to be attached to the optical assemblies in the curing fixture.
Figure 14:
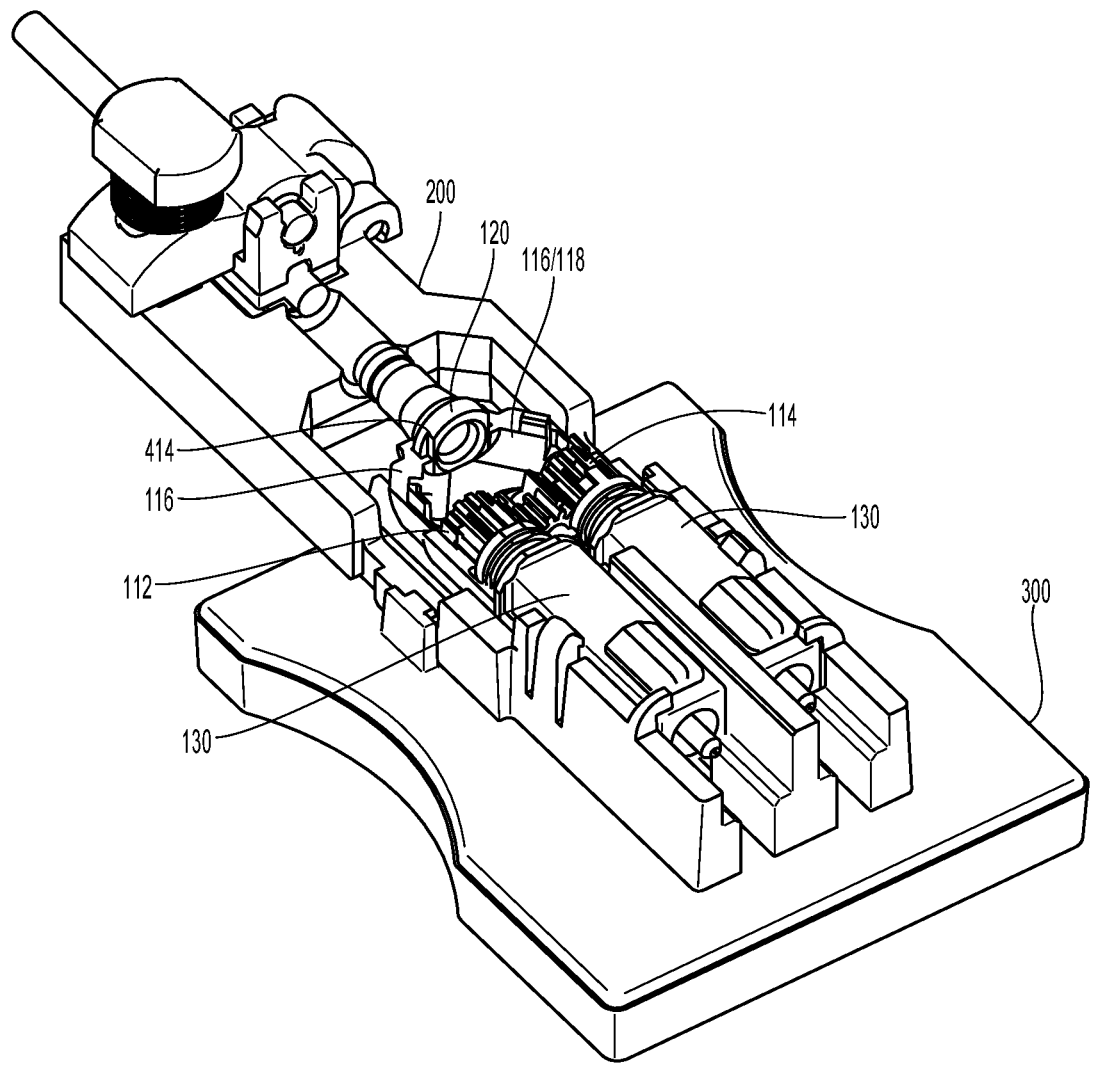
FIG. 14 is front, left perspective view of the body fixture of FIG. 13 and the curing fixture with one body portion being connected.

Turning now to FIGS. 12-14, the body 116/118 is added to the housings 104 and the crimp ring 120 to retain the relationship therebetween. In this embodiment, there are two portions—a bottom portion 116 and a top portion 118. Preferably, the bottom portion 116 is aligned with the housings 104 and the crimp ring 120. Each of the body portions 116 and 118 have structures that align with the two housings 104, the crimp ring 120, and the other body portion. For example, the body portions 116,118 have two projections 406 that engage the back of the housing. There is also a gear receiving portion 408 that supports the gear 114. At the rear end 410 of the body portions is a pocket 412 that receives a front portion of the crimp ring 120. It should be noted that the front portion of the crimp ring 120 has a two flat surfaces 414 that engage corresponding structure 416 in the pocket 412 and prevents the crimp ring 120 (and the optical fibers) from rotating. FIG. 13 shows the bottom portion 116 on a body fixture 420. The body fixture 420 holds the bottom portion 116 and can be inserted through the opening 230 in the curing fixture 200. The curing fixture 200 is more preferably disposed on top of the body fixture 420 and the housings 140 and crimp ring is aligned with the two projections 406, the gear receiving portion 408, and the pocket 412. See FIG. 14. The top portion 118 then can be added to the assembly and will mate with the bottom portion 116. The top portion 118 can be pressed onto and will latch with the bottom portion 116. Thus, the crimp ring 120, the optical fibers, and the housings 104 will remain in their relationship. The user can then crimp the crimp band 122 or a heat shrink (as the case may be) around the optical fibers/cable, add a boot and then the other housing parts as desired.

Figure 15:
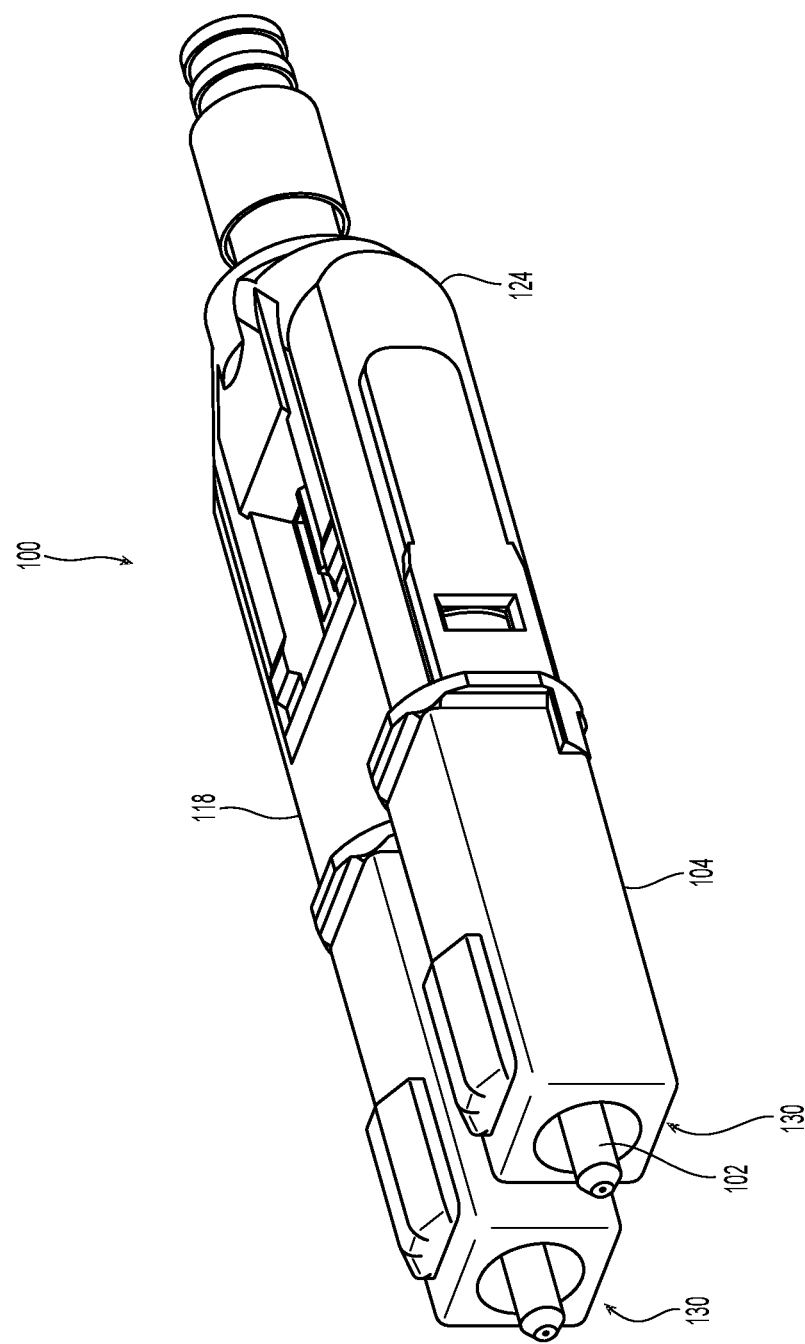
FIG. 15 is a perspective view of one embodiment of a uniboot fiber optic connector according to the present invention.

FIG. 15 illustrates a completed fiber optic connector 100—but without the latch body 124, latch release 126, and push-pull tab 128. However, those parts can be added quite easily to allow for use of the fiber optic connector 100. The optical fibers are securely positioned inside in a fixed relationship as noted above.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed:

1. A method of terminating a duplex fiber optic connector on respective optical fibers, the optical fibers having a jacket around at least a portion of the optical fibers, the method comprising:
   disposing a front portion of a pair of optical assemblies against a respective first stop surface;
   disposing a portion of the jacket against a second stop surface to prevent the optical fibers from being inserted any farther into an opening in the optical assemblies;
   curing epoxy around the optical fiber in the opening in the optical assemblies;
   assembling a body around a portion of the cured optical assemblies, which comprises aligning a first body portion from a bottom side of the cured optical assemblies and aligning a second body portion from a top side, the optical fibers passing through a crimp ring, the crimp ring engaging a slot in at least one of the first and second body portions; and
   crimping a portion of the jacket to the crimp ring.

2. The method according to claim 1, wherein the optical assemblies include a ferrule, a ferrule holder, a spring and a lead-in tube.

3. The method according to claim 2, wherein each of the ferrules have an end and the distance from the end of each of the ferrules to the jacket is the same.

4. The method according to claim 2, wherein each the optical assemblies include a gear attached to a rear end of the ferrule holder, the method further comprising inserting a third gear between the gears on the rear ends of the ferrule holders.

5. The method according to claim 1, wherein the curing involves putting the optical assemblies and the optical fibers in an oven.

6. The method according to claim 1, wherein the optical fibers are inserted into the optical assemblies before being disposed against the first stop surface.

7. The method according to claim 1, wherein the first and second stop surfaces are on a single fixture.

8. The method according to claim 1, wherein the optical fibers are secured to a fixture.

9. The method according to claim 1, wherein a fixture is used having the first stop surfaces and the second stop surface.

10. The method according to claim 9, wherein the fixture has a clamp to secure the optical fibers to the fixture.

11. A method of terminating a duplex fiber optic connector on respective optical fibers, the optical fibers having a jacket around at least a portion of the optical fibers, the method comprising:
    disposing a pair of optical assemblies against a respective first stop surface;
    disposing a portion of the jacket against a second stop surface to prevent the optical fibers from being inserted any farther into an opening in the optical assemblies;
    curing epoxy around the optical fiber in the opening in the optical assemblies;
    assembling a body around a portion of the cured optical assemblies by aligning a first body portion from a bottom side of the cured optical assemblies and aligning a second body portion from a top side, the optical fibers passing through a crimp ring, the crimp ring engaging a slot in at least one of the first and second body portions; and
    crimping a portion of the jacket to the crimp ring.

\* \* \* \* \*